(12) United States Patent
Whalen

(10) Patent No.: US 12,623,923 B2
(45) Date of Patent: May 12, 2026

(54) SYSTEM AND METHOD OF DISTILLING/DESALINATING WATER IN A VACUUM-APPLIED CENTRIFUGAL MULTI-PHASE MANNER

(71) Applicant: Daniel Anthony Whalen, Arlington, NY (US)

(72) Inventor: Daniel Anthony Whalen, Arlington, NY (US)

( * ) Notice: Subject to any disclaimer, the term of this patent is extended or adjusted under 35 U.S.C. 154(b) by 471 days.

(21) Appl. No.: 18/488,670

(22) Filed: Oct. 17, 2023

(65) Prior Publication Data

US 2024/0124327 A1 Apr. 18, 2024

Related U.S. Application Data

(63) Continuation-in-part of application No. 17/967,625, filed on Oct. 17, 2022, now Pat. No. 11,878,919.

(51) Int. Cl.
| | |
|---|---|
| *C02F 1/06* | (2023.01) |
| *C02F 1/22* | (2023.01) |
| *C02F 1/38* | (2023.01) |
| *C02F 103/08* | (2006.01) |

(52) U.S. Cl.
CPC .................. *C02F 1/06* (2013.01); *C02F 1/22* (2013.01); *C02F 1/38* (2013.01); *C02F 2103/08* (2013.01); *C02F 2201/005* (2013.01); *C02F 2301/063* (2013.01)

(58) Field of Classification Search
CPC ... B01D 3/10; B01D 3/42; C02F 1/048; C02F 1/06; C02F 1/22; C02F 1/38; C02F 2103/001; C02F 2103/08; C02F 2201/005; C02F 2201/006; C02F 2301/063
See application file for complete search history.

(56) References Cited

U.S. PATENT DOCUMENTS

| | | | |
|---|---|---|---|
| 3,240,024 | A | 3/1966 | Ashley et al. |
| 3,690,116 | A | 9/1972 | Cheng et al. |
| 3,714,791 | A | 2/1973 | Peck |
| 3,813,892 | A | 6/1974 | Johnson et al. |
| 4,170,328 | A | 10/1979 | Kirk et al. |
| 4,236,382 | A | 12/1980 | Cheng et al. |
| 4,420,318 | A | 12/1983 | Cheng et al. |

(Continued)

FOREIGN PATENT DOCUMENTS

| | | |
|---|---|---|
| AU | 2004287763 B2 | 3/2007 |
| EP | 162095 B1 | 5/1988 |

*Primary Examiner* — Brian A Mccaig

(57) ABSTRACT

A system and method of distilling/desalinating water in a vacuum-applied multi-phase centrifugal manner purifies water of its dissolved and/or undissolved contaminants. The system includes at least one primary vessel, at least one vacuum apparatus, at least one secondary vessel, and at least one centrifugal processor. The primary vessel initially retains a quantity of source water. A vacuum pressure is then generated inside the primary vessel with the vacuum apparatus, which evaporates a first water portion off the source water and freezes a second water portion on the source water. The first water portion is then condensed inside the secondary vessel. After the remaining source water is drained out of the primary vessel, the second water portion is transferred and treated by the centrifugal processor. The liquid first water portion is transferred into the centrifugal processor melting the frozen second water portion and consequently forming a quantity of purified water.

20 Claims, 19 Drawing Sheets

(56)        References Cited

U.S. PATENT DOCUMENTS

| | | | |
|---|---|---|---|
| 4,505,728 | A | 3/1985 | Cheng et al. |
| 5,360,554 | A | 11/1994 | Sloan et al. |
| 7,094,341 | B2 | 8/2006 | Max |
| 8,444,830 | B2 | 5/2013 | Davey |
| 8,695,360 | B2 | 4/2014 | Enis et al. |

(A) Providing at least one primary vessel, at least one vacuum apparatus, at least one secondary vessel, and at least one centrifugal processor, wherein the primary vessel and the secondary vessel are in fluid communication through the vacuum apparatus, and wherein the primary vessel and the secondary vessel are in fluid communication with the centrifugal processor (B) Providing a quantity of source water retained by the primary vessel (C) Evaporating a first water portion off the quantity of source water and transferring the first water portion from the primary vessel, through the vacuum apparatus, and into the secondary vessel by generating a vacuum pressure inside the primary vessel with the vacuum apparatus (D) Condensing and retaining the first water portion inside the secondary vessel as an ambient pressure is maintained inside the secondary vessel (E) Freezing a second water portion from the quantity of source water within the primary vessel by generating the vacuum pressure inside the primary vessel with the vacuum apparatus (F) Draining a liquid remaining portion of the quantity of source water out of the primary vessel, wherein the liquid remaining portion is located underneath the second water portion

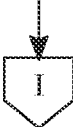

FIG. 3

SYSTEM AND METHOD OF DISTILLING/DESALINATING WATER IN A VACUUM-APPLIED CENTRIFUGAL MULTI-PHASE MANNER

The current application is a continuation-in-part (CIP) application of the U.S. non-provisional application Ser. No. 17/967,625 filed on Oct. 17, 2022.

FIELD OF THE INVENTION

The present invention generally relates to purifying water of contaminants. More specifically, the present invention uses a vacuum to evaporate some portion of water and to freeze some other portion of water, which purifies the evaporated and frozen portions of water.

BACKGROUND OF THE INVENTION

Humankind's demand on Earth's freshwater sources is increasing over time with population growth and increased living standards. Earth's freshwater sources are depleting at higher rates, while Earth's rates of freshwater replenishment are largely unchanged. Desalination of seawater for freshwater use is an attractive solution to humankind's future freshwater needs; however, the current state of available desalination technologies is both energy-intensive and cost-intensive. Thus, there is a need for a more sustainable and energy efficient desalination method to help solve humankind's future freshwater needs.

The Earth currently replenishes freshwater naturally through evaporation-precipitation methods, whereby water is desalinated/purified through evaporation and supplied via precipitation in the liquid-phase (rain) or solid-phase (snow). Additionally, ocean water freezes in locations with low enough temperatures, which allow for a lower salinity when frozen. Evaporation is driven by energy from the sun and heat transfer across the different phases of water is exchanged and maintained by the Earth's atmosphere.

Therefore, one objective of the present invention is to apply methods similar to the purification process of the Earth's natural freshwater cycle, utilizing multiple phases of water for desalination/purification and managing the heat transfer across each phase. The present invention increases the rate of freshwater production using vacuum and centrifugal technology and reduces the energy requirement by utilizing the inherent heat transfer properties of each phase to drive the functioning of the present invention in a sustainable, cost-effective, and energy efficient manner. The goal of the present invention is to provide a sustainable distilling/desalination system and method that can be used to meet humankind's future freshwater needs.

Moreover, the freezing point of water depends on several factors, including salinity. The freezing point of water decreases as salinity increases. Because of this phenomenon, the kinetics of freezing saltwater involve less-saline portions of the water freezing first. The remaining water increases in salinity and drives the freezing point lower. As the temperature continues to drop, the water continues freezing and subsequently concentrating the rejected salt in smaller volumes of water, which eventually become trapped in the surrounding ice. The same kinetic process occurs inversely with the melting point of frozen salt water, resulting in higher salinity portions of the water melting first.

Therefore, another objective of the present invention is to operate on the melting principles of frozen saltwater, applying a centrifugal driving force that facilitates the separation of trapped and melted saltwater from the retained less-saline frozen water. Additionally, the present invention provides an even dispersion of heat across the frozen saltwater that catalyzes the melting, and subsequent desalting, process. The present invention is designed to further desalinate the solid-phase (i.e., frozen) water leaving the present invention.

SUMMARY OF THE INVENTION

The present invention is a novel water treatment process that separates water from dissolved and non-dissolved constituents, primarily salt. The present invention combines different separation technologies that utilize water in the liquid-phase, gas-phase, and solid-phase to desalinate and purify the water. Furthermore, the inherent energy transfer properties of these different technologies are utilized to drive the functioning of the present invention in a sustainable manner.

The main objective of the present invention is distilling/desalinating seawater for potable water production; however, the present invention inherently separates/purifies water from any form of dissolved or non-dissolved constituents, introducing alternative applications such as, but not limited to, the following:

Desalination of seawater for potable water production

Treatment of wastewater streams to purify water

Treatment of stormwater streams to purify water

Treatment of industrial and contaminated water streams to purify water

Separation processes involving water from dissolved and non-dissolved constituents Potential applications of the present invention cover any process whereby separation/purification of water from a constituent-containing water body of any volume is desired.

BRIEF DESCRIPTION OF THE DRAWINGS

FIG. 3 is a flowchart illustrating an overall process for the method of the present invention.

DETAILED DESCRIPTION OF THE INVENTION

All illustrations of the drawings are for the purpose of describing selected versions of the present invention and are not intended to limit the scope of the present invention.

Figure 1:
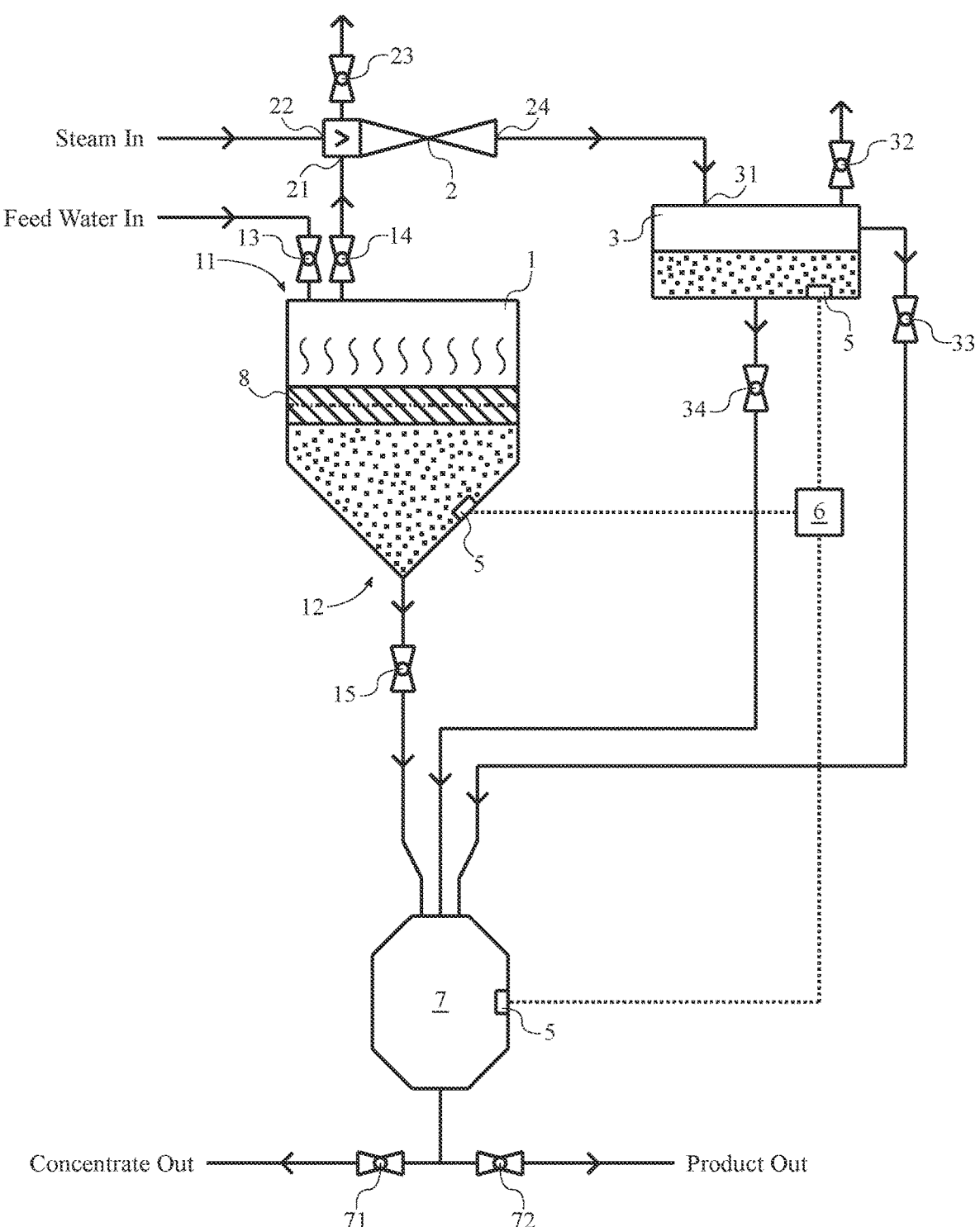
FIG. 1 is a block diagram illustrating the system of the present invention.

The present invention is a system and a method of distilling/desalinating water in a vacuum-applied multi-phase manner. The present invention is able to distill/desalinate a quantity of water by evaporating some portions of the quantity of water and by freezing some other portions of the quantity of water. As can be seen in FIG. 1, the system of the present invention is provided with at least one primary vessel 1, at least one vacuum apparatus 2, at least one secondary vessel 3, and at least one centrifugal processor 7 (Step A), each of which can be made of metallic or non-metallic materials, can handle a wide range of temperatures (i.e., temperatures ranging from the freezing point of water to the boiling point of water), and can be any geometric configuration. The primary vessel 1 and the secondary vessel 3 are used to retain the water at different stages of the distilling/desalinating process and are preferably thermally-insulated vessels. More specifically, the thermally-insulated vessels are double-walled vessels, each of which has a vacuum retained between its double walls. Alternatively, each double-wall vessel can have another kind of material with a low heat-transfer value that is retained between its double walls (i.e., foam insulation). The primary vessel 1 and the secondary vessel 3 are in fluid communication through the vacuum apparatus 3 so that the vacuum apparatus 2 is able to move a fluid from the primary vessel 1 into the secondary vessel 3. The vacuum apparatus 2 can be, but is not limited to, a vacuum ejector, a turbine, or a rotary-vane pump. The centrifugal processor 7 is used to further distill/desalinate frozen water that has already gone through some stages of the distilling/desalinating process. The primary vessel 1 and the secondary vessel 3 are also in fluid communication with the centrifugal processor 7 so that the centrifugal processor 7 is able to receive frozen water or fluids from the primary vessel 1 or the secondary vessel 3. The primary vessel 1, the secondary vessel, the vacuum apparatus 2, and the centrifugal processor 7 can also work as a closed system when the vacuum apparatus 2 is generating a vacuum but can selectively vent the closed system to outside atmosphere at specific areas and/or times if necessary. In addition, a quantity of source water is retained by the primary vessel 1 (Step B) and is the water that needs to be separated from its dissolved and/or undissolved contaminants by the present invention.

Figure 4:
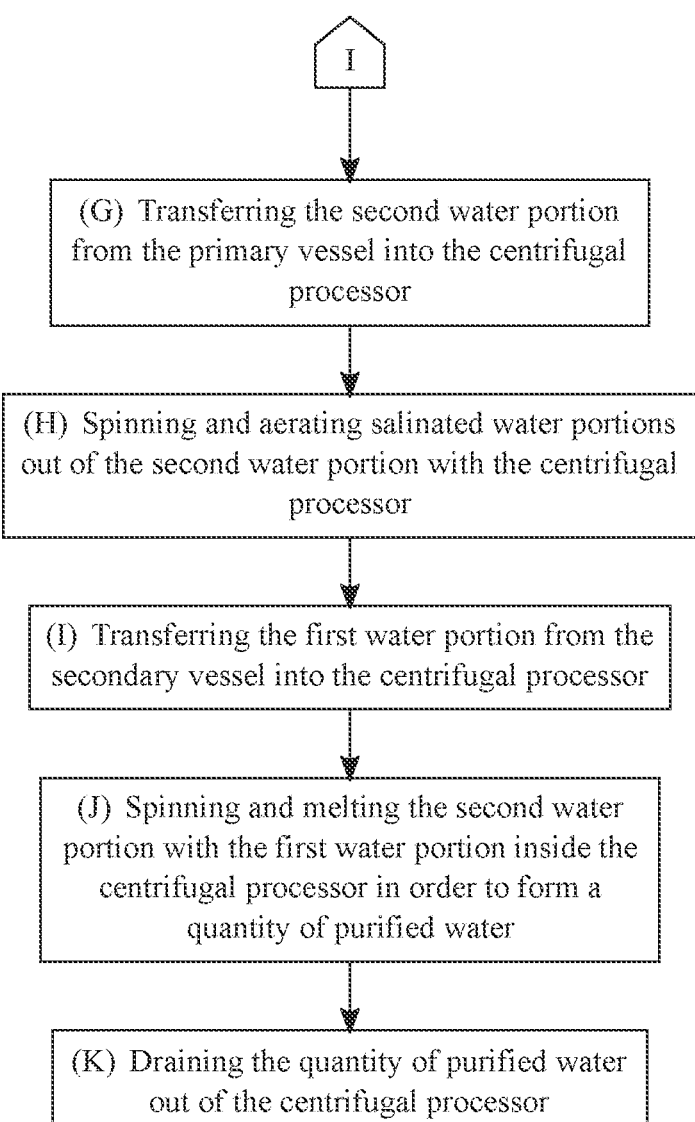
FIG. 4 is a continuation of FIG. 3.

As can be seen in FIGS. 3 and 4, an overall process for the method of the present invention allows water to be distilled/desalinated by having the water go through multiple phase changes. The overall process begins by evaporating a first water portion off the quantity of source water and transferring the first water portion from the primary vessel 1, through the vacuum apparatus 2, and into the secondary vessel 3 by generating a vacuum pressure inside the primary vessel 1 with the vacuum apparatus 2 (Step C). The vacuum pressure generated inside the primary vessel 1 reduces a boiling temperature for the quantity of source water, which allows the first water portion to evaporate off the quantity of source water at an ambient temperature and allows the first water portion to be distilled/desalinated of its dissolved and/or undissolved contaminants. The first water portion in its gas state is consequently able to travel from the primary vessel 1, through the vacuum apparatus 2, and to the secondary vessel 3. The overall process continues by condensing and retaining the first water portion inside the secondary vessel 3 as an ambient pressure is maintained inside the secondary vessel 3 (Step D). The ambient pressure inside the secondary vessel 3 returns a condensation temperature of the first water portion to be approximately 373 degrees Kelvin at normal temperature and pressure (NTP). The first water portion in its liquid state is consequently collected and retained until later in the overall process. In addition, the vacuum pressure generated inside the primary vessel 1 with the vacuum apparatus 2 is used to freeze a second water portion from the quantity of source water within the primary vessel 1 (Step E) because a substantial amount of thermal energy is removed from the quantity of source water as the first water portion is evaporated off the quantity of source water (i.e., the latent heat of vaporization) and eventually releases this substantial amount of thermal energy in the secondary vessel 3 during Step D (i.e., the latent heat of condensation). The second water portion in its solid state is consequently suspended within the primary vessel 1 as a layer of ice. The freezing of the second water portion also distills/desalinates the second water portion of its dissolved and/or undissolved contaminants by pushing its dissolved and/or undissolved contaminants out of the second water portion as ice crystals are formed from the second water portion.

After phase changing portions of the quantity of source water between different states of matter in order to distill/desalinate those portions, the overall process continues by draining a liquid remaining portion of the quantity of source water out of the primary vessel 1 (Step F), which leaves only the second water portion in its solid state suspended within the primary vessel 1. The liquid remaining portion is located underneath the second water portion because the second water portion in its solid state forms as a top layer of ice on the liquid remaining portion. The liquid remaining portion also acts as a repository for the dissolved and/or undissolved contaminants that were removed from the first water portion and the second water portion. The overall process continues by transferring the second water portion from the primary vessel 1 into the centrifugal processor 7 (Step G) so that the second water portion as a layer of ice is broken into a plurality of ice particles and consequently falls from the primary vessel 1 into the centrifugal processor 7. Salinated water portions are then aerated and spun out of the second water portion with the centrifugal processor (Step H) so that the second water portion is further distilled/desalinated of its dissolved and/or undissolved contaminants. This occurs because the most pure water freezes first at the center of an ice particle and because the least pure water freezes last at the periphery of the ice particle. Consequently, the aeration and spinning of the plurality of ice particles during Step H melts and removes the least pure water from the periphery of each ice particle. The overall process continues by transferring the first water portion from the secondary vessel 3 into the centrifugal processor 7 (Step I) so that the first water portion in its liquid state comes in physical contact with the second water portion in its solid state. Consequently, the first water portion melts the second water portion inside the centrifugal processor 7 as the second water portion is again spun inside the centrifugal processor 7, which eventually allows the first water portion and the second water portion in their liquid states to mix together and form a quantity of purified water (Step J). The quantity of purified water is the combined portions of the quantity of source water that were distilled/desalinated of its dissolved and/or undissolved contaminants. The overall process concludes by draining the quantity of purified water out of the centrifugal processor 7 (Step I) so that the quantity of purified water can be used as an end product of the present invention.

In order to describe how the fluid flow is valved within the system of the present invention, the primary vessel 1 is provided with a gravitationally-higher side 11 and a gravitationally-lower side 12, which are shown in FIG. 1. The gravitationally-higher side 11 is the side of the primary vessel 1 that is the farthest from the ground, while the gravitationally-lower side 12 is the side of the primary vessel 1 that is the closest to the ground. Thus, the gravitationally-higher side 11 and the gravitationally-lower side 12 need to be positioned opposite to each other about the primary vessel 1.

Figure 5:
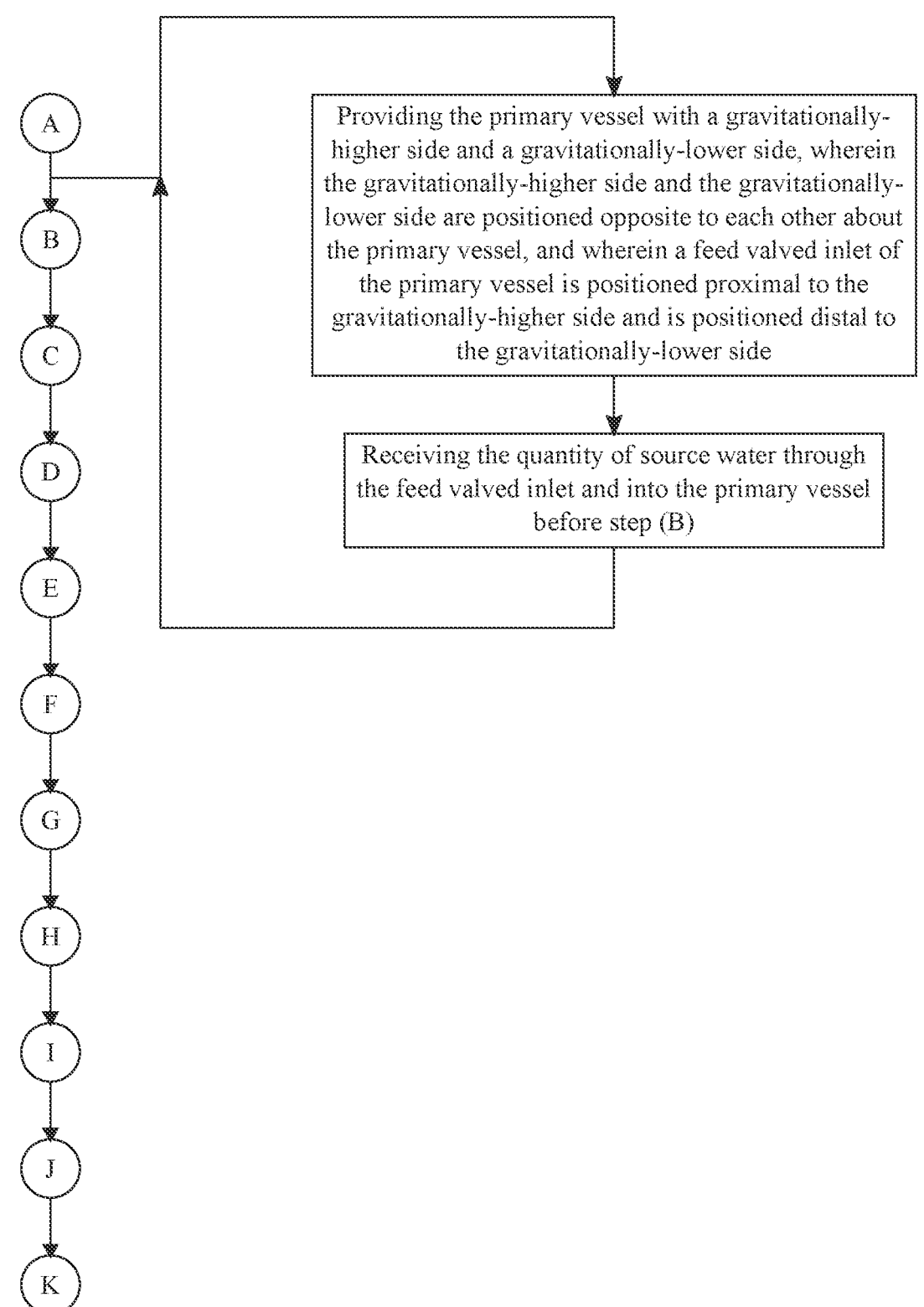
FIG. 5 is a flowchart illustrating a subprocess for filling the primary vessel with the quantity of source water.

As can be seen in FIGS. 1 and 5, a feed valved inlet 13 of the primary vessel 1 is an inlet that can be selectively opened or closed in order to fill the primary vessel 1 with untreated water containing dissolved and/or undissolved contaminants. The feed valved inlet 13 is positioned proximal to the gravitationally-higher side 11 and is positioned distal to the gravitationally-lower side 12, which allows the primary vessel 1 to be initially filled from its top. Thus, the quantity of source water is received through the feed valved inlet 13 and into the primary vessel 1 before Step B. The quantity of source water is preferably retrieved from a natural source of untreated water (e.g., a source of seawater or freshwater) and/or from a recycled source of untreated water (e.g., the liquid remaining portion from a previous iteration of the overall process). The quantity of source water is then preferably retained within a feed tank until the feed valved inlet 13 is opened to fill the primary vessel 1 with the quantity of source water.

Figure 6:
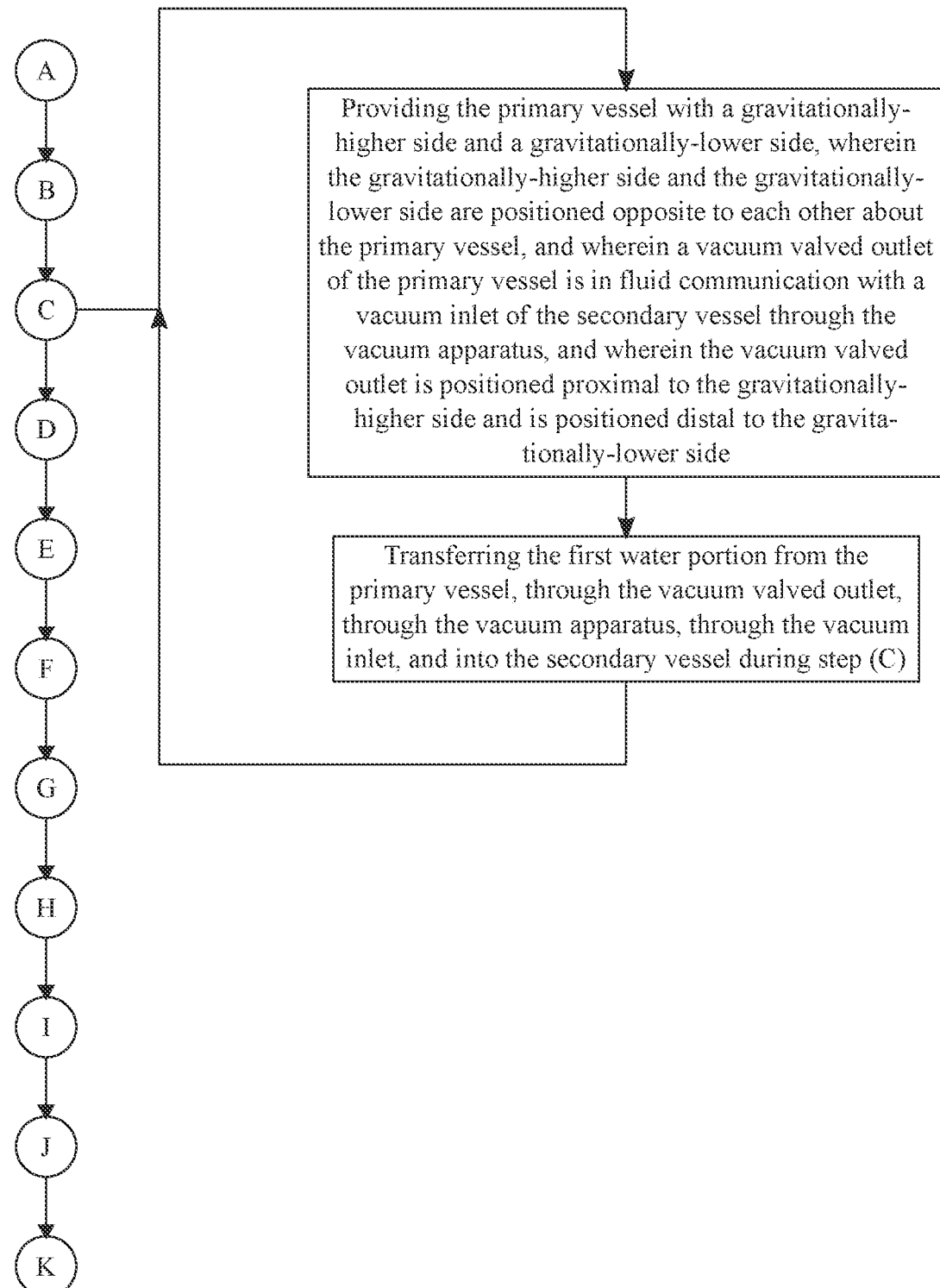
FIG. 6 is a flowchart illustrating a subprocess for transferring the first water portion into the secondary vessel.

As can be seen in FIGS. 1 and 6, a vacuum valved outlet 14 of the primary vessel 1 is an outlet that can be selectively opened or closed in order to release the first water portion in its gas state from the primary vessel 1, while a vacuum inlet 31 of the secondary vessel 3 is an inlet that remains opens in order to fill the secondary vessel 3 with the first water portion in its gas state. The vacuum valved outlet 14 is in fluid communication with the vacuum inlet 31 through the vacuum apparatus 2, which allows a fluid to be driven from the primary vessel 1, through the vacuum apparatus 2, and into the secondary vessel 3. Moreover, the vacuum valved outlet 14 is positioned proximal to the gravitationally-higher side 11 and is positioned distal to the gravitationally-lower side 12, which allows a gas to naturally rise and be released out of the primary vessel 1. Thus, the first water portion is transferred from the primary vessel 1, through the vacuum valved outlet 14, through the vacuum apparatus 2, through the vacuum inlet 31, and into the secondary vessel 3 during Step C.

Figure 7:
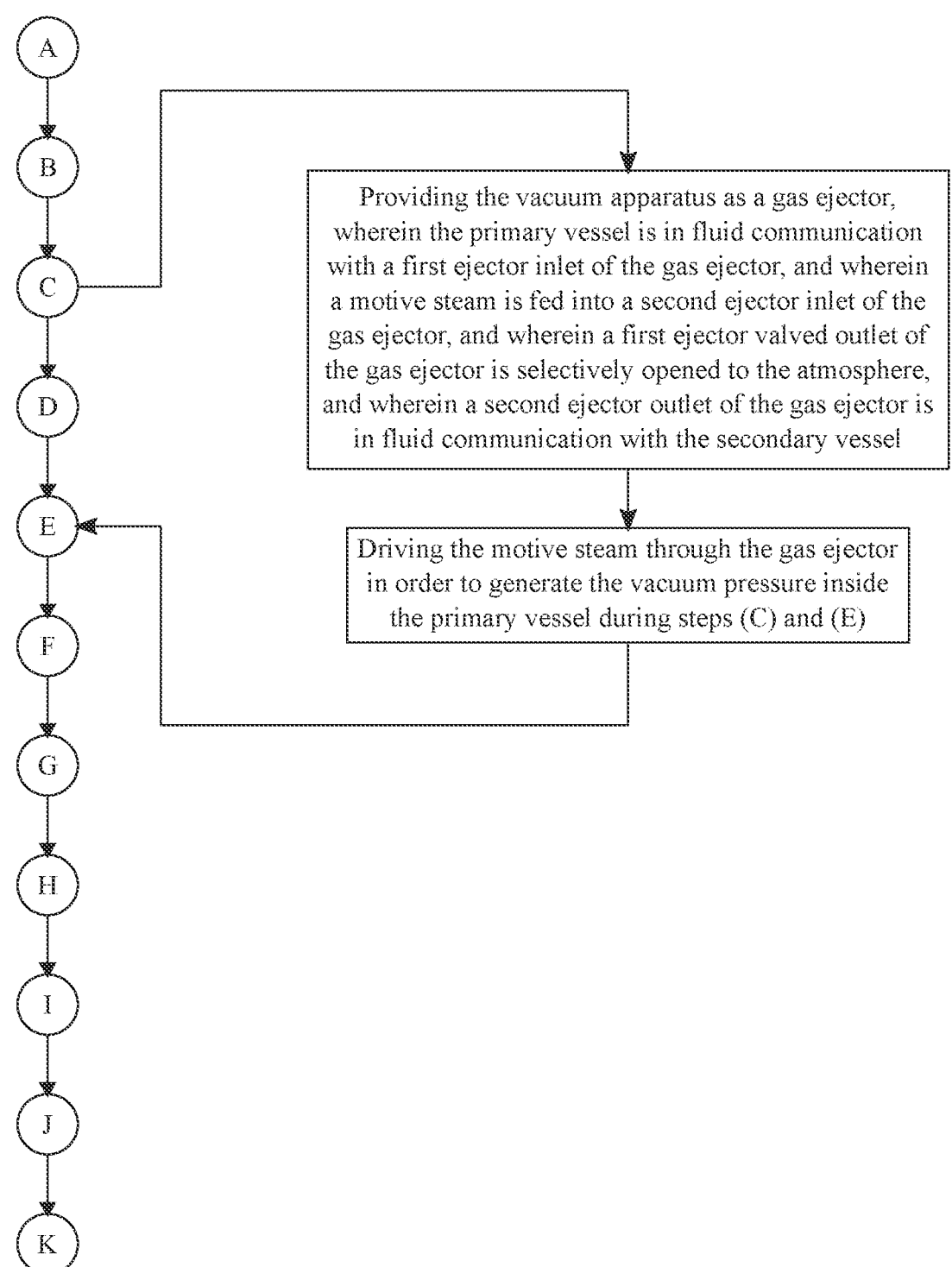
FIG. 7 is a flowchart illustrating a subprocess for driving the first water portion through the vacuum apparatus.

As can be seen in FIGS. 1 and 7, the vacuum apparatus 2 acts as an engine to drive the transfer movement of the first water portion in its gas state from the primary vessel 1 and into the secondary vessel 3. The vacuum apparatus 2 is preferably a gas ejector that produces a vacuum by means of the Venturi effect. Thus, the gas ejector comprises a first ejector inlet 21, a second ejector inlet 22, a first ejector valved outlet 23, and a second ejector outlet 24. The primary vessel 1 is in fluid communication with the first ejector inlet 21, which allows the gas ejector to receive the first water portion in its gas state from the primary vessel 1. A motive steam is fed into the second ejector inlet 22 and is used to drive the movement of the first water portion in its gas state from the primary vessel 1, through the vacuum apparatus 2, and into the secondary vessel 3. The motive steam may also supplement the first water portion in its gas state with additional thermal energy and additional liquid-phase volume as the first water portion condenses into its liquid state. Alternatively, another kind of motive gas (e.g., air) can be used with the gas ejector instead of the motive steam. The first ejector valved outlet 23 is selectively opened or closed to the atmosphere in order to manage the fluid flow through the gas ejector. The second ejector outlet 24 is in fluid communication with the secondary vessel 3, which allows the gas ejector to deposit the first water portion in its gas state into the secondary vessel 3. Thus, the arrangement for the first ejector inlet 21, the second ejector inlet 22, the first ejector valved outlet 23, and the second ejector outlet 24 allows the motive steam to be driven through the gas ejector in order to generate the vacuum pressure inside the primary vessel 1 during Steps C and E. Furthermore, the system of the present invention may be further provided with a steam tank, which retains enough steam gas to feed the motive steam into the second ejector inlet 22. The secondary vessel 3 may also be in fluid communication with the steam tank in order to transfer some of the unused steam within the secondary vessel 3 to the steam tank, which allows the unused steam to be recycled into the motive steam.

Figure 8:
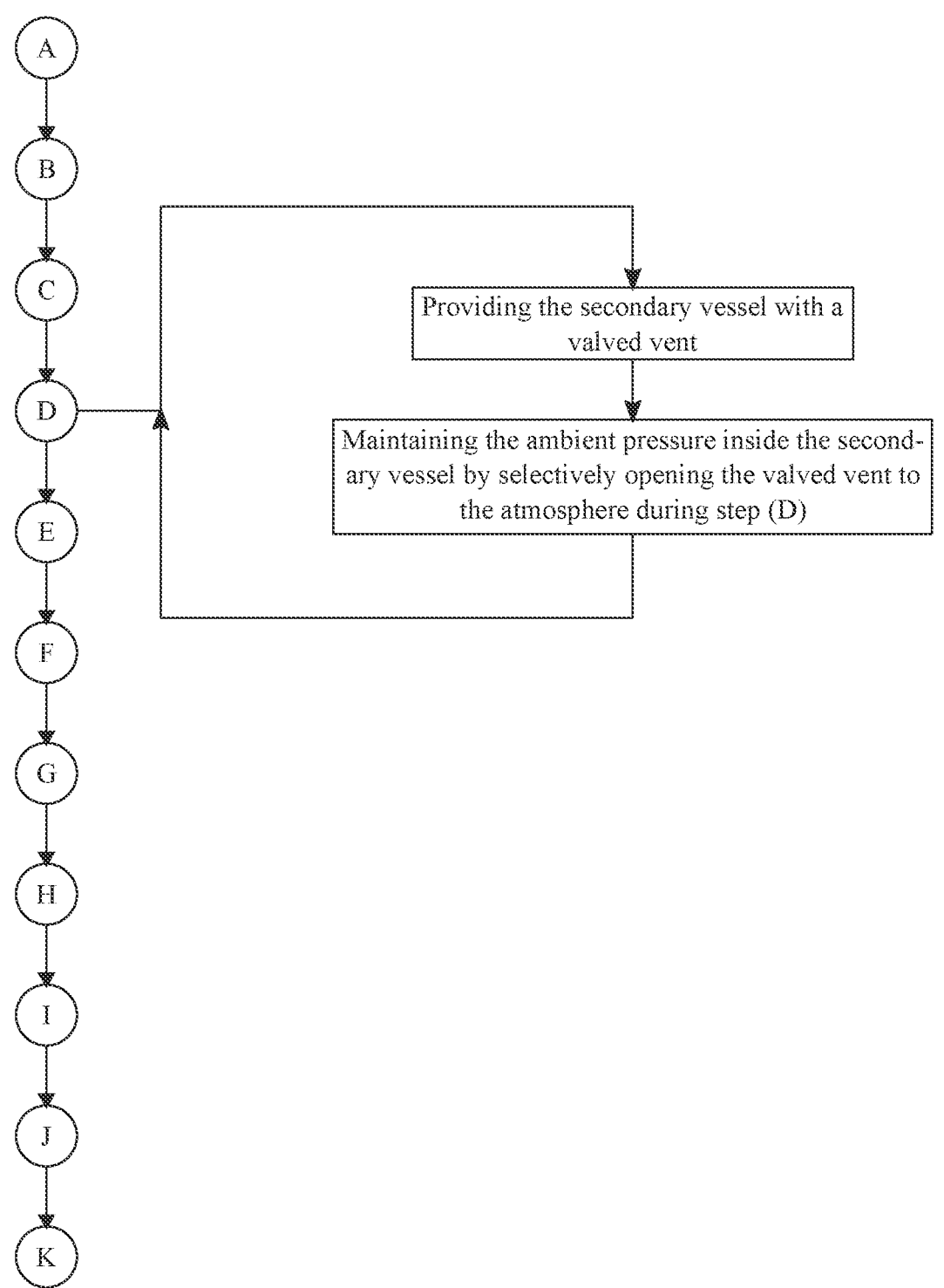
FIG. 8 is a flowchart illustrating a subprocess for venting the secondary vessel.

As can be seen in FIGS. 1 and 8, the secondary vessel 3 is preferably provided with a valved vent 32 that is used to readily release an excess amount of pressure from the secondary vessel 3. The excess amount of pressure may be a result of accumulating the first water portion in its gas state. Thus, the ambient pressure inside the secondary vessel 3 is maintained by selectively opening the valved vent 32 to the atmosphere during Step D in order to prevent structural failure of the secondary vessel 3 from an excess amount of pressure.

Figure 9:
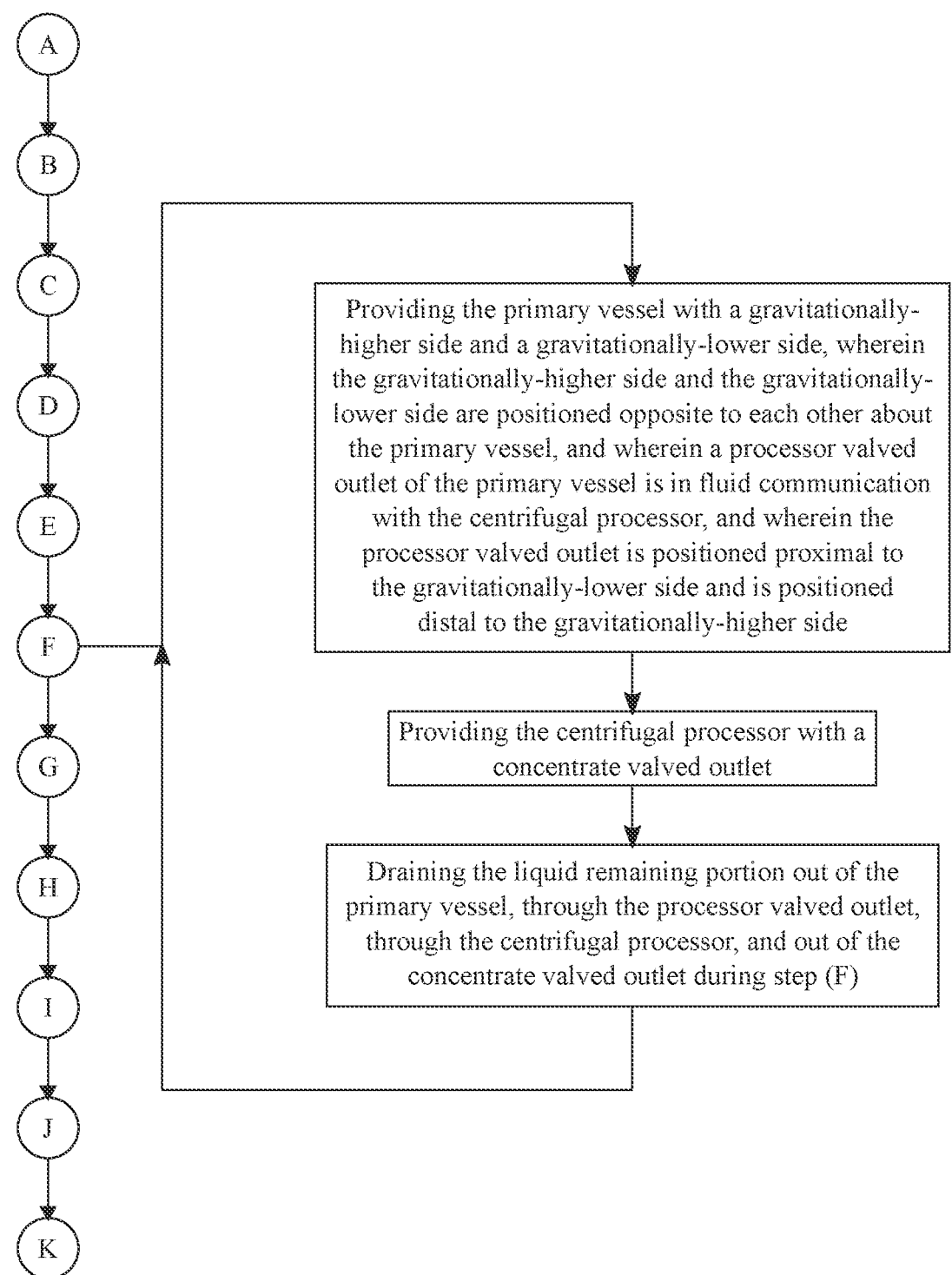
FIG. 9 is a flowchart illustrating a subprocess for draining the liquid remaining portion out of the primary vessel and the centrifugal processor.

As can be seen in FIGS. 1 and 9, a processor valved outlet 15 of the primary vessel 1 is an outlet that can be selectively opened or closed in order to transfer the untreated water with its dissolved and/or undissolved contaminants from the primary vessel 1. The processor valved outlet 15 is positioned proximal to the gravitationally-lower side 12 and is positioned distal to the gravitationally-higher side 11 so that the processor valved outlet 15 can be in fluid communication with the centrifugal processor 7. This arrangement allows the untreated water to gravitationally drain out of the primary vessel 1, through the processor valved outlet 15, and into the centrifugal processor 7. Moreover, a concentrate valved outlet 71 of the centrifugal processor 7 is an outlet that can be selectively opened or closed in order to release the untreated water with its dissolved and/or undissolved contaminants from the centrifugal processor 7. Thus, the liquid remaining portion is drained out of the primary vessel 1, through the processor valved outlet 15, through the centrifugal processor 7, and out of the concentrate valved outlet 71 during Step F. The liquid remaining portion can then be sent to a waste repository or to a feed tank for the present invention, which would recycle the liquid remaining portion as the quantity of source water in a subsequent iteration of the overall process. Furthermore, the centrifugal processor 7 can be used to collect ice crystals dislodged from the second water portion in its solid state as the liquid remaining portion exits the centrifugal processor 7. More specifically, a meshed component of the centrifugal processor 7 is able to strain a liquid being drained out of the centrifugal processor 7. Thus, the ice crystals can be filtered out of the liquid remaining portion with the meshed component of the centrifugal processor 7 as the liquid remaining portion is drained from the primary vessel 1, through the centrifugal processor 7, and out of the concentrate valved outlet 71. The ice crystals can then remain on the mesh component of the centrifugal processor 7 until later in the method of the present invention.

Figure 10:
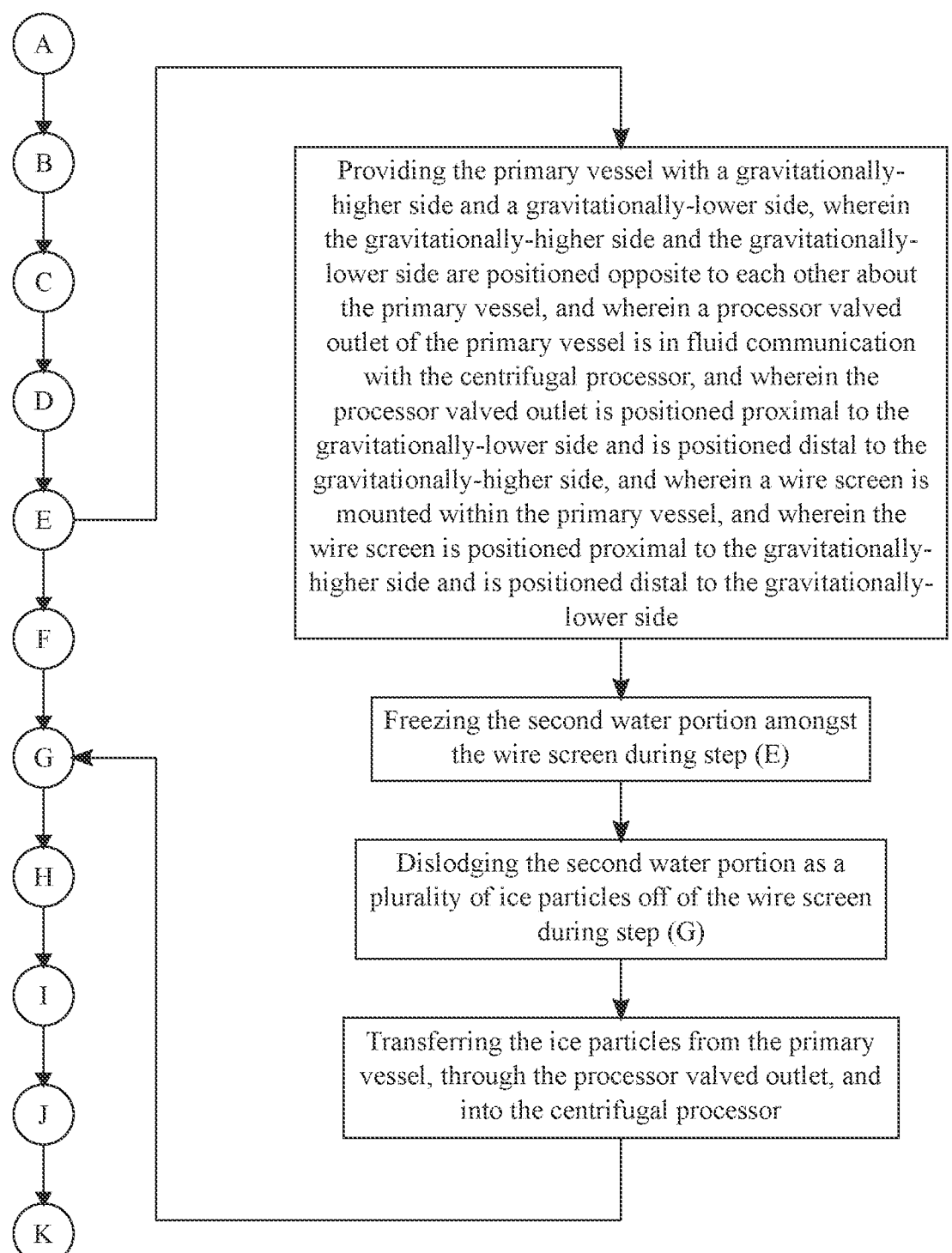
FIG. 10 is a flowchart illustrating a subprocess for transferring the second water portion in its solid state from the primary vessel into the centrifugal processor.

As can be seen in FIGS. 1 and 10, a wire screen 8 mounted within the primary vessel 1 provides a default nucleation site for the second water portion to freeze into its solid state. The wire screen 8 also creates breaking points throughout the second water portion in its solid state. The wire screen 8 is positioned proximal to the gravitationally-higher side 11 and is positioned distal to the gravitationally-lower side 12 so that the second water portion in its solid state is able to form above the liquid remaining portion. Thus, the second water portion freezes amongst the wire screen 8 during Step E and is dislodged as a plurality of ice particles off of the wire screen 8 during Step G. The use of the wire screen 8 is analogous to freezing water in a cube tray and then dislodging ice cubes out of the cube tray. The primary vessel 1 can use an internal mechanism to punch the plurality of ice particles out of the wire screen 8 during Step G. The ice particles are then transferred from the primary vessel 1, through processor valved outlet 15, and into the centrifugal processor 7, which allows the centrifugal processor 7 to further distill/desalinate the ice particles. The processor valved outlet 15 is configured with a sufficient diameter to accommodate the flow of the liquid remaining portion from the primary vessel 1 into the centrifugal processor 7 and to accommodate the release of ice particles from the primary vessel 1 into the centrifugal processor 7.

Figure 2:
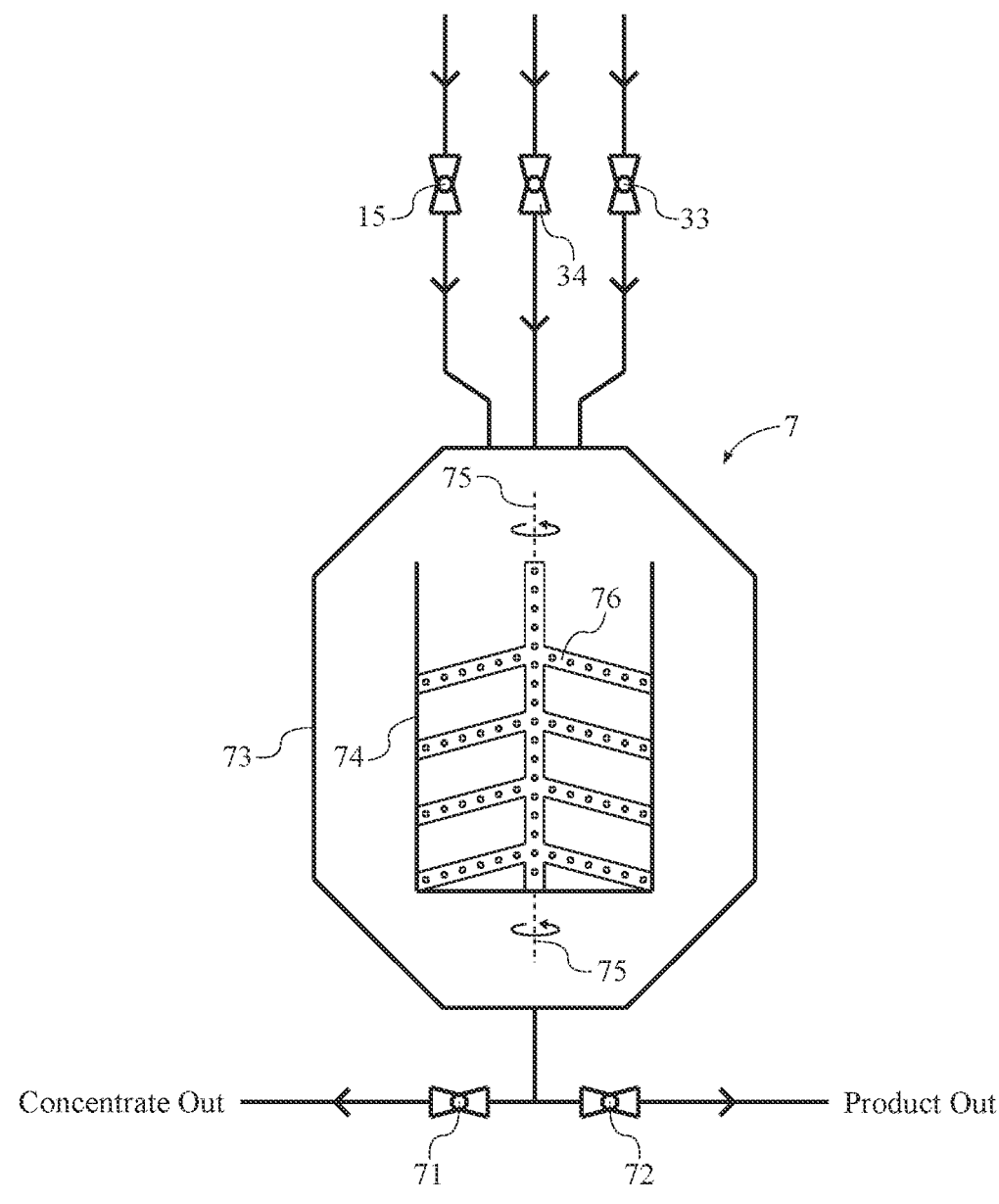
FIG. 2 is a block diagram detailing the centrifugal processor for the system of the present invention.
Figure 11:
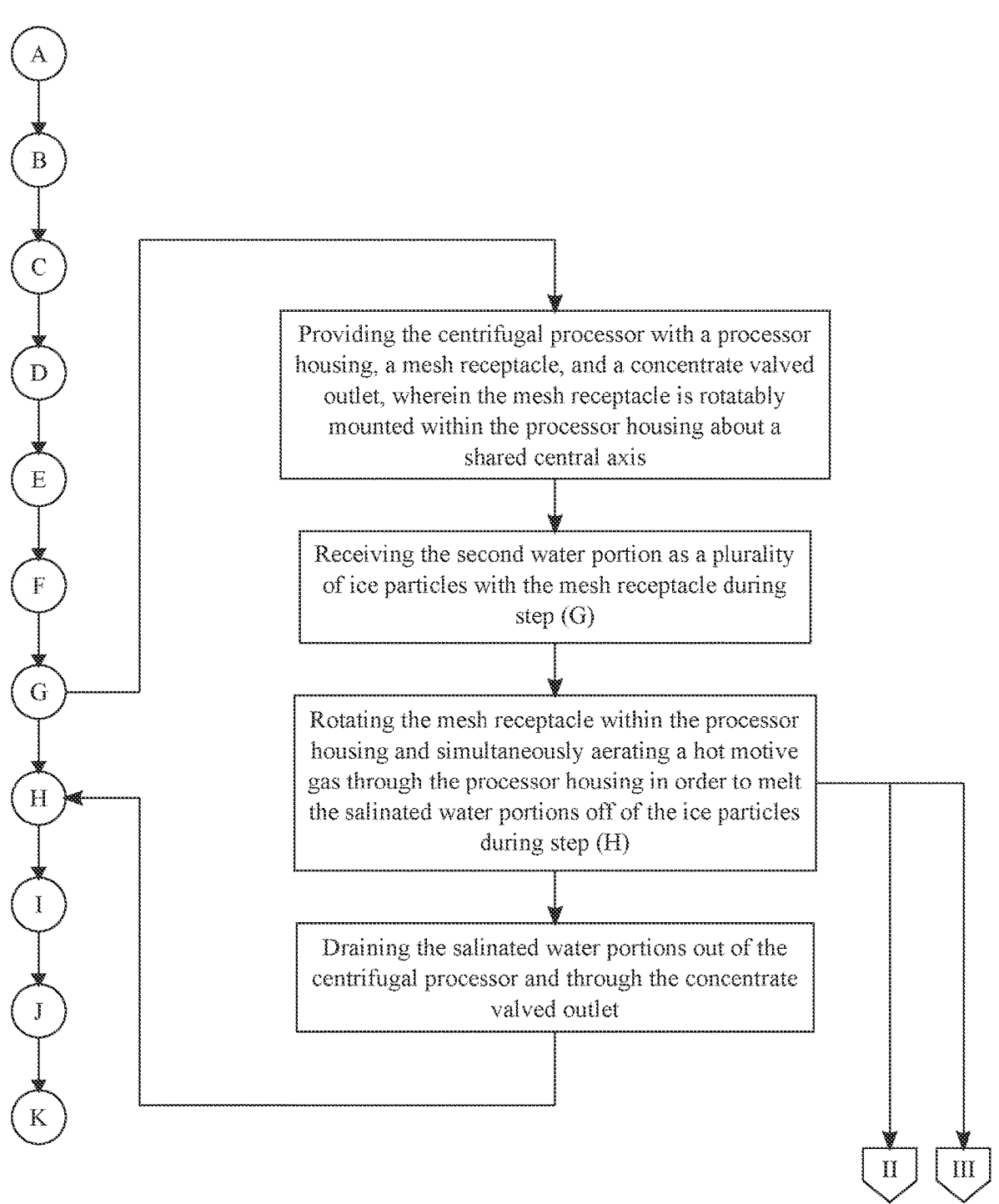
FIG. 11 is a flowchart illustrating a subprocess for further reducing the salinity of the second water portion with the centrifugal processor.

As can be seen in FIGS. 1, 2, and 11, one purpose of the centrifugal processor 7 is to aerate and spin the salinated water portions off of the ice particles. Thus, the centrifugal processor 7 may further comprise a processor housing 73 and a mesh receptacle 74. The processor housing 73 is a hermetically-sealed enclosure to house the other components of the centrifugal processor 7 and to provide an internal treatment area for the ice particles. The mesh receptacle 74 is an open-ended hollow body made of a mesh material and some framing and is used to receive and retain the ice particles as the ice particles are aerated and spun by the centrifugal processor 7. The mesh receptacle 74 is preferably a cylindrical shape with an open end (i.e., positioned proximal to the primary vessel 1) and a closed end (i.e., positioned distal to the primary vessel 1). The mesh receptacle 74 is also rotatably mounted within the processor housing 73 about a shared central axis 75 so that the mesh receptacle 74 can rotate inside of the processor housing 73 without any mechanical obstructions. Ceramic bearings are preferably used to rotatably mount the mesh receptacle 74 within the processor housing 73. Thus, the second water portion is received as a plurality of ice particles with the mesh receptacle 74 during Step G so that the mesh receptacle 74 is able to retain the ice particles for its future treatment by the centrifugal processor 7. The mesh receptacle 74 is then rotated within the processor housing 73, and a hot motive gas is simultaneously aerated through the processor housing 73, which allows the salinated water portions to be melted off the periphery of each ice particle during Step H. The salinated water portions finally seep through the mesh receptacle 74 and drain out of the centrifugal processor 7 and through the concentrate valved outlet 71, which further reduces the already-low salinity of each ice particle.

Figure 12:
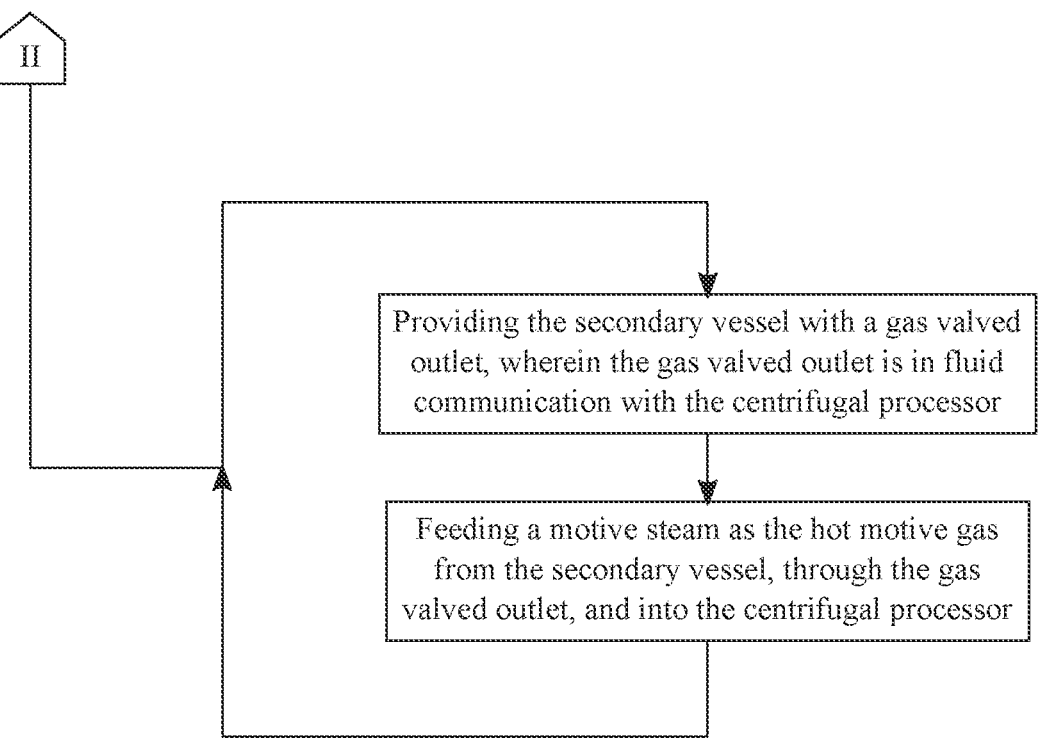
FIG. 12 is a flowchart illustrating a subprocess for transferring the hot motive gas from the secondary vessel into the centrifugal processor.

As can be seen in FIGS. 1 and 12, the secondary vessel 3 may further comprise a gas valved outlet 33, which is an outlet that can be selectively opened or closed in order to release the hot motive gas from the secondary vessel 3. The gas valved outlet 33 is located on a gravitationally-higher portion of the secondary vessel 3 and is in fluid communication with the centrifugal processor 7 so that a motive steam can be fed as the hot motive gas from the secondary vessel 3, through the gas valved outlet 33, and into the centrifugal processor 7. The secondary vessel 3 can be a source for the hot motive gas because the motive steam is generated during Step C by an uncondensed portion of the first water portion, by the motive steam being fed into a gas ejector as the vacuum apparatus 2, or a combination thereof. Alternatively, another kind of hot motive gas (e.g., heated air) can be used with the centrifugal processor 7 instead of the motive steam from the secondary vessel 3.

Figure 13:
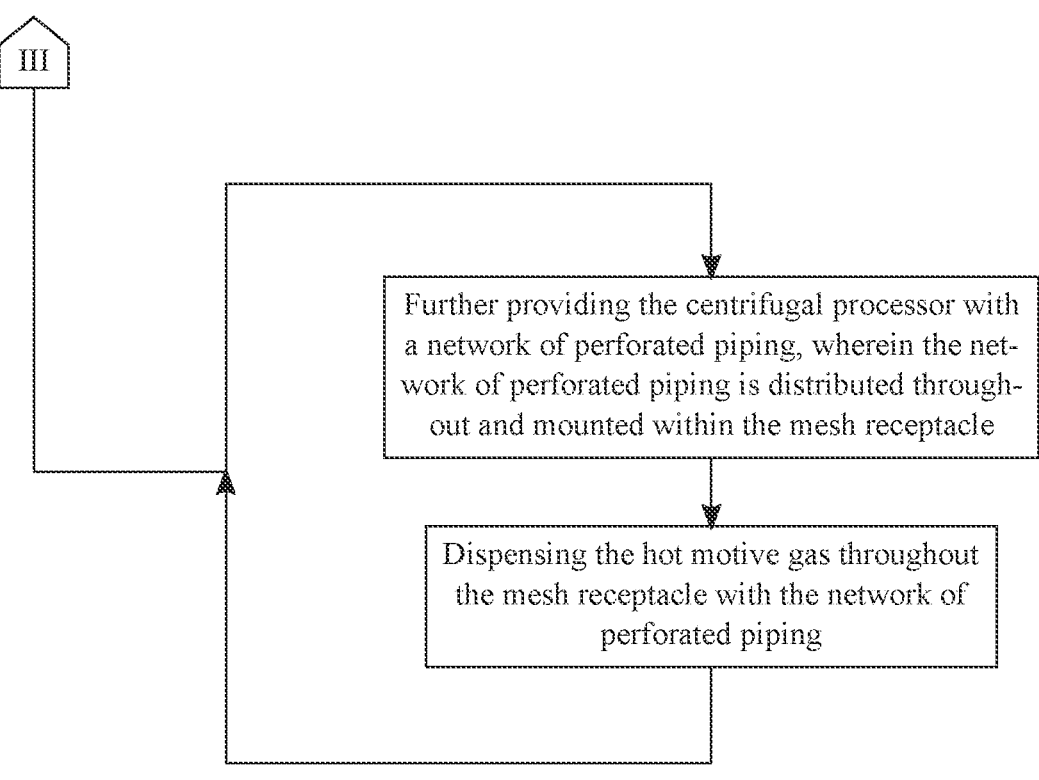
FIG. 13 is a flowchart illustrating a subprocess for dispensing the hot motive gas throughout the centrifugal processor.
Figure 14:
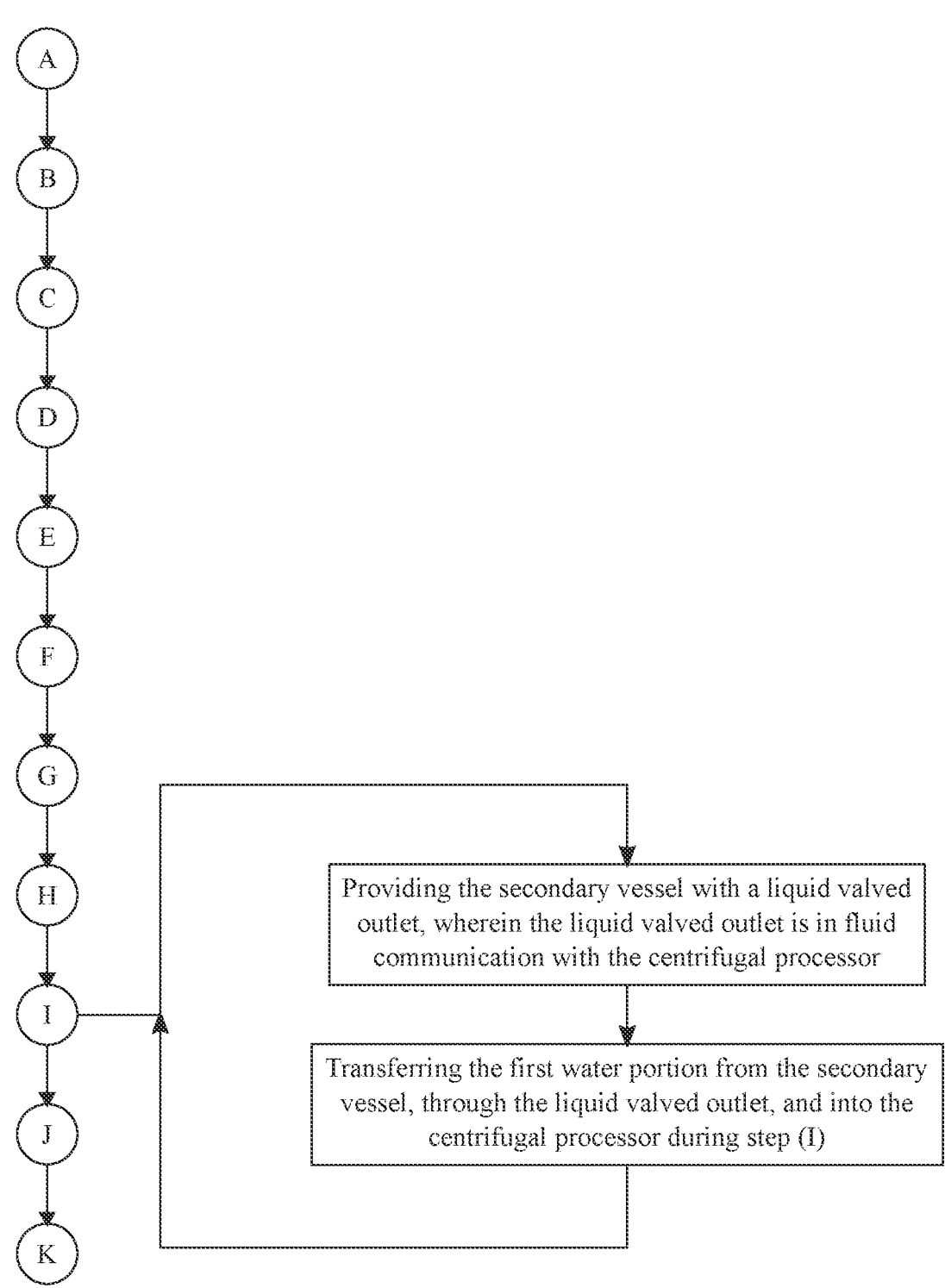
FIG. 14 is a flowchart illustrating a subprocess for transferring the first water portion in its liquid state from the secondary vessel to the centrifugal processor.
Figure 15:
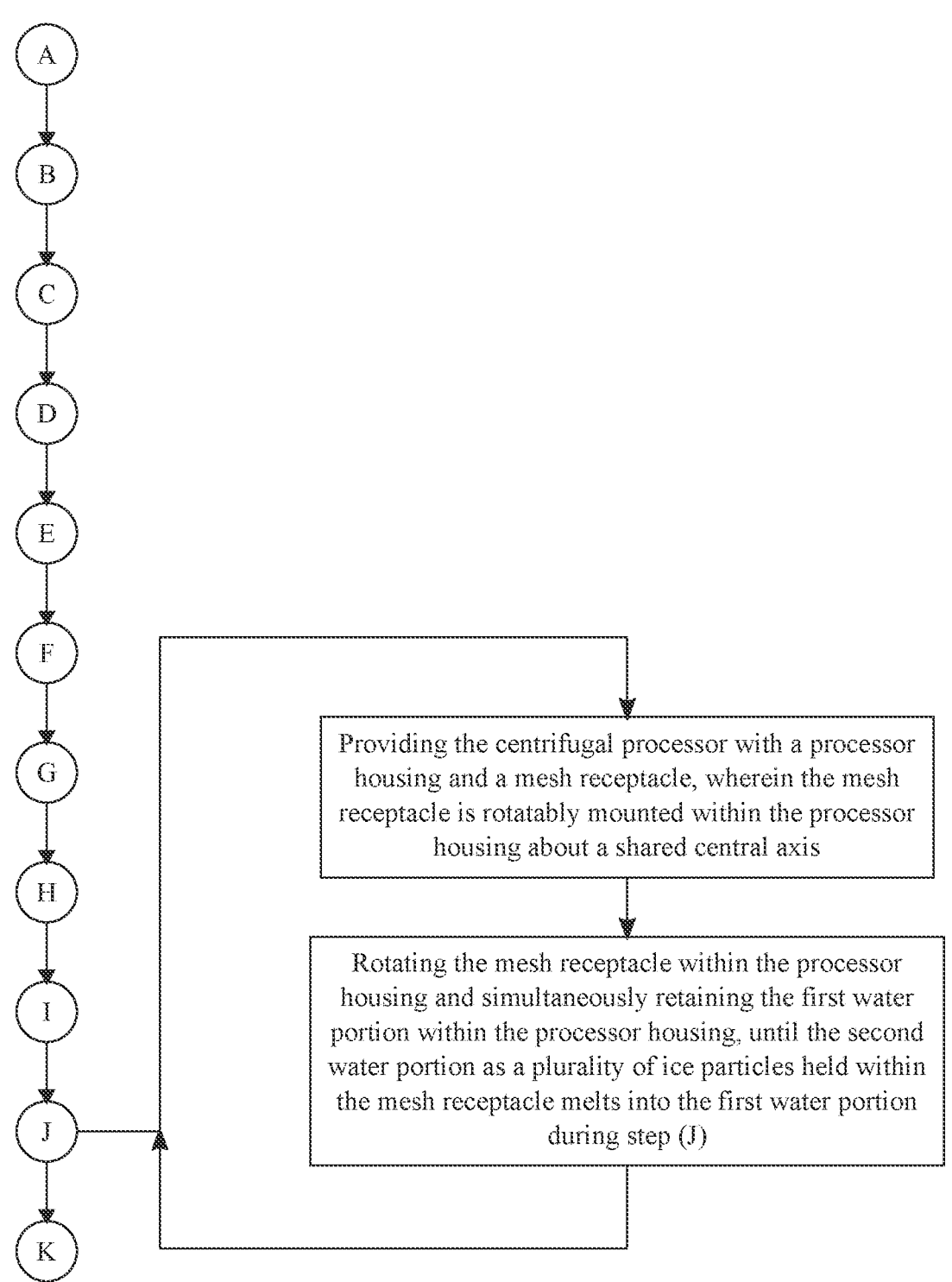
FIG. 15 is a flowchart illustrating a subprocess for melting the second water portion in its solid state into the first water portion in its liquid state within the centrifugal processor.
Figure 16:
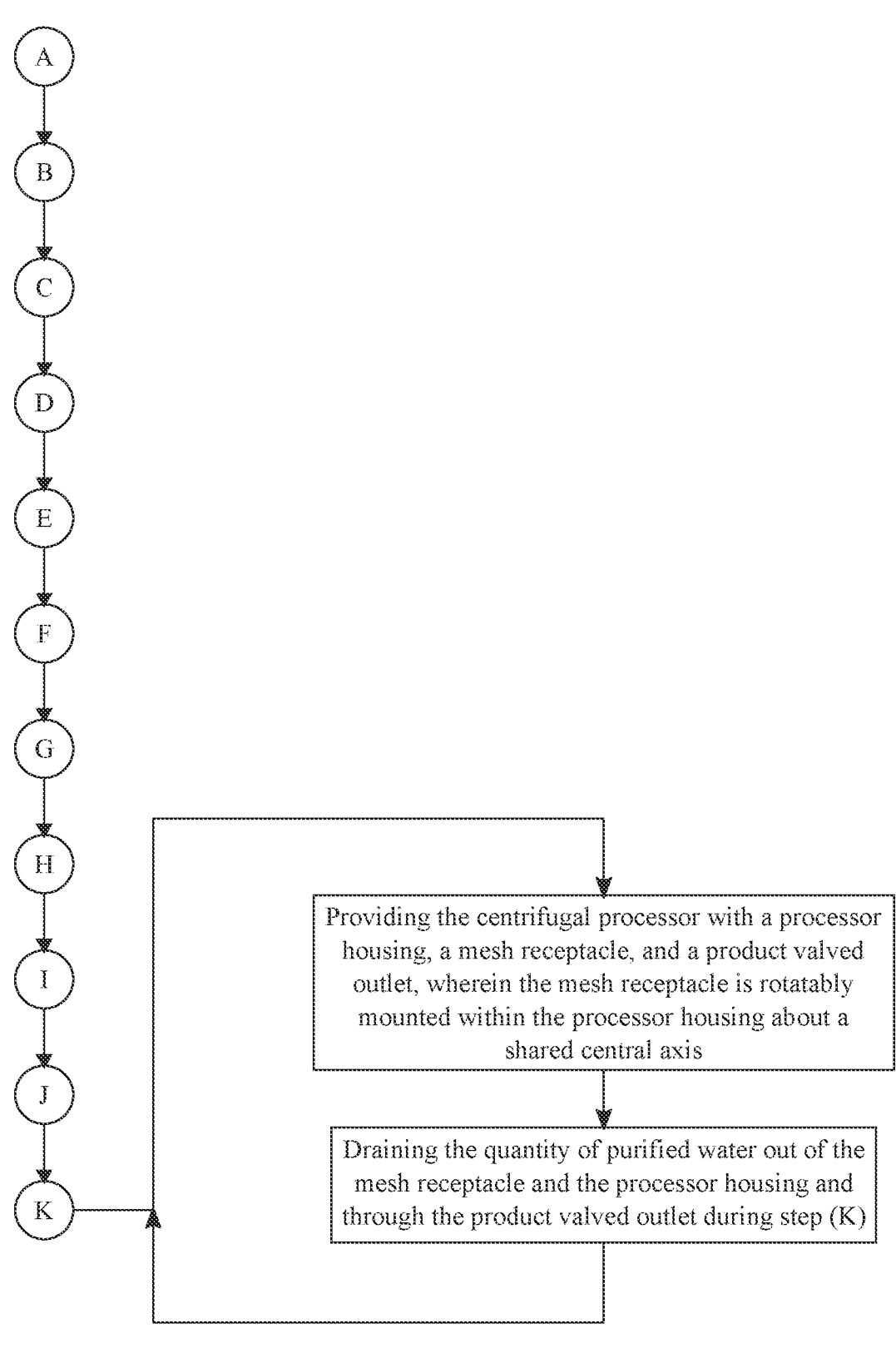
FIG. 16 is a flowchart illustrating a subprocess for draining the quantity of purified water out of the centrifugal processor.

As can be seen in FIGS. 2 and 13, the centrifugal processor 7 may further comprise a network of perforated piping 76, which is used to evenly melt off the salinated water portions from the periphery of each ice particle. Thus, the network of perforated piping 76 is distributed throughout and mounted within the mesh receptacle 74 so that the hot motive gas can be dispensed throughout the mesh receptacle 74 with the network of perforated piping 76. Moreover, the network of perforated piping 76 is torsionally mounted to the mesh receptacle 74 so that the network of perforated piping 76 rotates in unison with the mesh receptacle 74.

As can be seen in FIGS. 1, 2, and 14-16, another purpose of the centrifugal processor 7 is to melt the ice particles into the first water portion before draining the distilled/desalinated water out of the centrifugal processor 7. Thus, the secondary vessel 3 may further comprise a liquid valved outlet 34, which is an outlet that can be selectively opened or closed in order to release the first water portion in its liquid state from the secondary vessel 3. The liquid valved outlet 34 is located on a gravitationally-lower portion of the secondary vessel 3 and is in fluid communication with the centrifugal processor 7 so that the first water portion can be transferred from the secondary vessel 3, through the liquid valved outlet 34, and into the centrifugal processor 7 during Step I. The ice particles (i.e., the second water portion) are then spun within the centrifugal processor 7 by rotating the mesh receptacle 74 within the processor housing 73, while the first water portion is retained within the processor housing 73, until the ice particles held within the mesh receptacle 74 melts into the first water portion during Step J, which allows the first water portion distilled/desalinated via an evaporation-condensation process and the second water portion distilled/desalinated via a freezing-melting process to be combined together forming the quantity of purified water. Moreover, the centrifugal processor 7 may further comprise a product valved outlet 72, which is an outlet that can be selectively opened or closed in order to dispense a liquid end product out of the present invention. Thus, the quantity of purified water is drained out of the mesh receptacle 74 and the processor housing 73 and through the product valved outlet 72 during Step K.

As can be seen in FIG. 1, at least one internal modification to the primary vessel 1 may be configured to promote ice-crystal growth at specific nucleation sites during Step E. Nucleation sites can be promoted within the primary vessel 1 through a variety of different internal modifications. For example, one kind of internal modification to the primary vessel 1 is to add a lining/coating to an inner surface of the primary vessel 1 so that the inner surface of primary vessel 1 can act as nucleation sites for ice-crystal growth.

Figure 17:
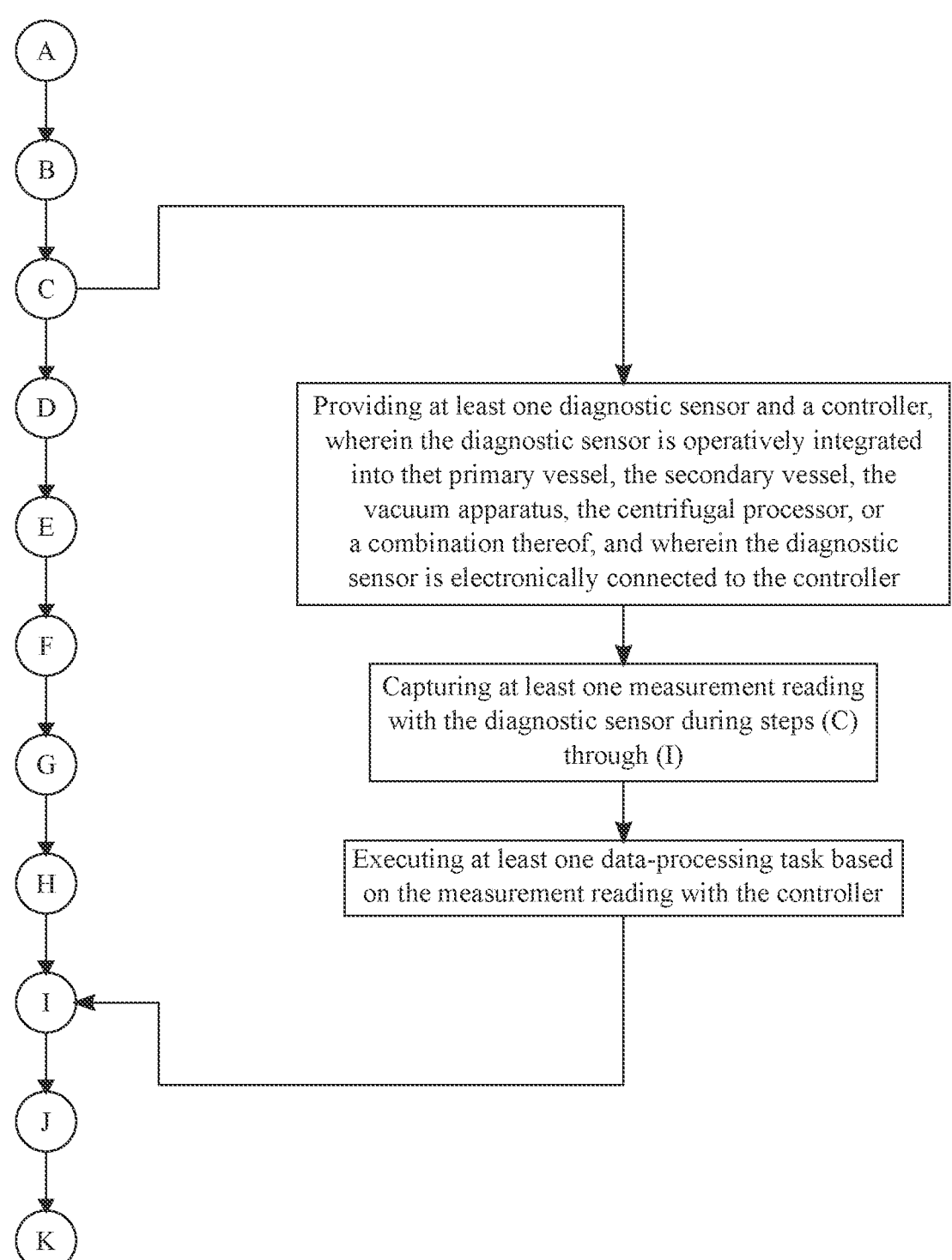
FIG. 17 is a flowchart illustrating a subprocess for processing diagnostic data for the system of the present invention.

As can be seen in FIGS. 1 and 17, the system of the present invention may use at least one diagnostic sensor 5 and a controller 6 in order to track whether or not its internal components are properly and/or optimally functioning. The diagnostic sensor 5 is used to take a quantitative reading on some internal physical condition of the system of the present invention, which allows at least one measurement reading to be captured with the diagnostic sensor 5 during Steps C through I. The measurement reading can be, but is not limited to, a pressure reading, a temperature reading, a flowrate reading, an ice-detection reading, a water-quality reading, or a combination thereof. The controller 6 is used to manage and process data for the system of the present invention and is used to manage and process commands to and from the other electronic components for the system of the present invention. Thus, the controller 6 is able to execute at least one data-processing task based on the measurement reading. The data-processing task can be, but is not limited to, logging and storing data, outputting a warning based on a short-term data trend, outputting a warning based on a long-term data trend, relaying data to a display to be viewed by a user, or a combination thereof.

Figure 18:
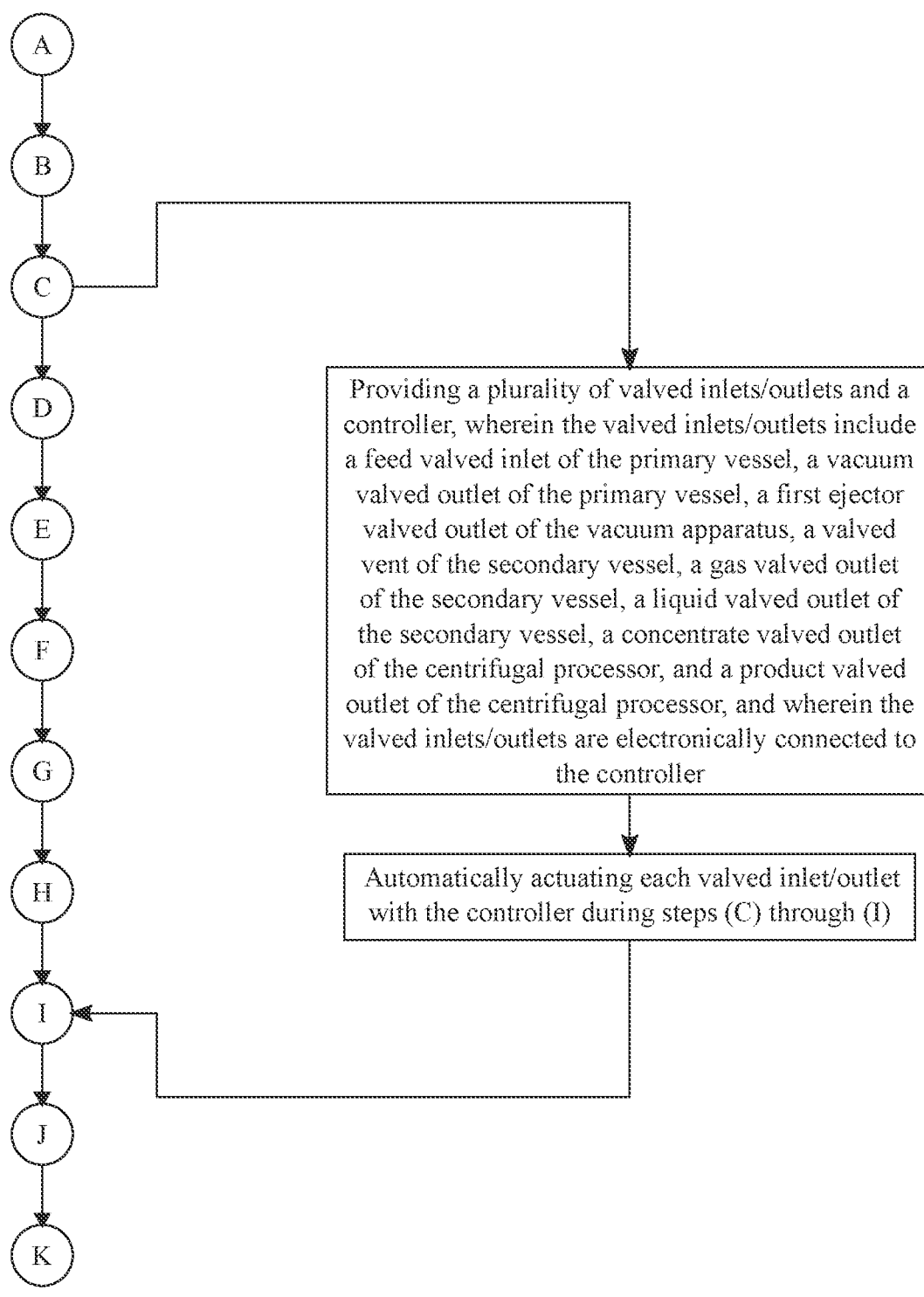
FIG. 18 is a flowchart illustrating a subprocess for automatically actuating the valved inputs/outputs for the system of the present invention.
Figure 19:
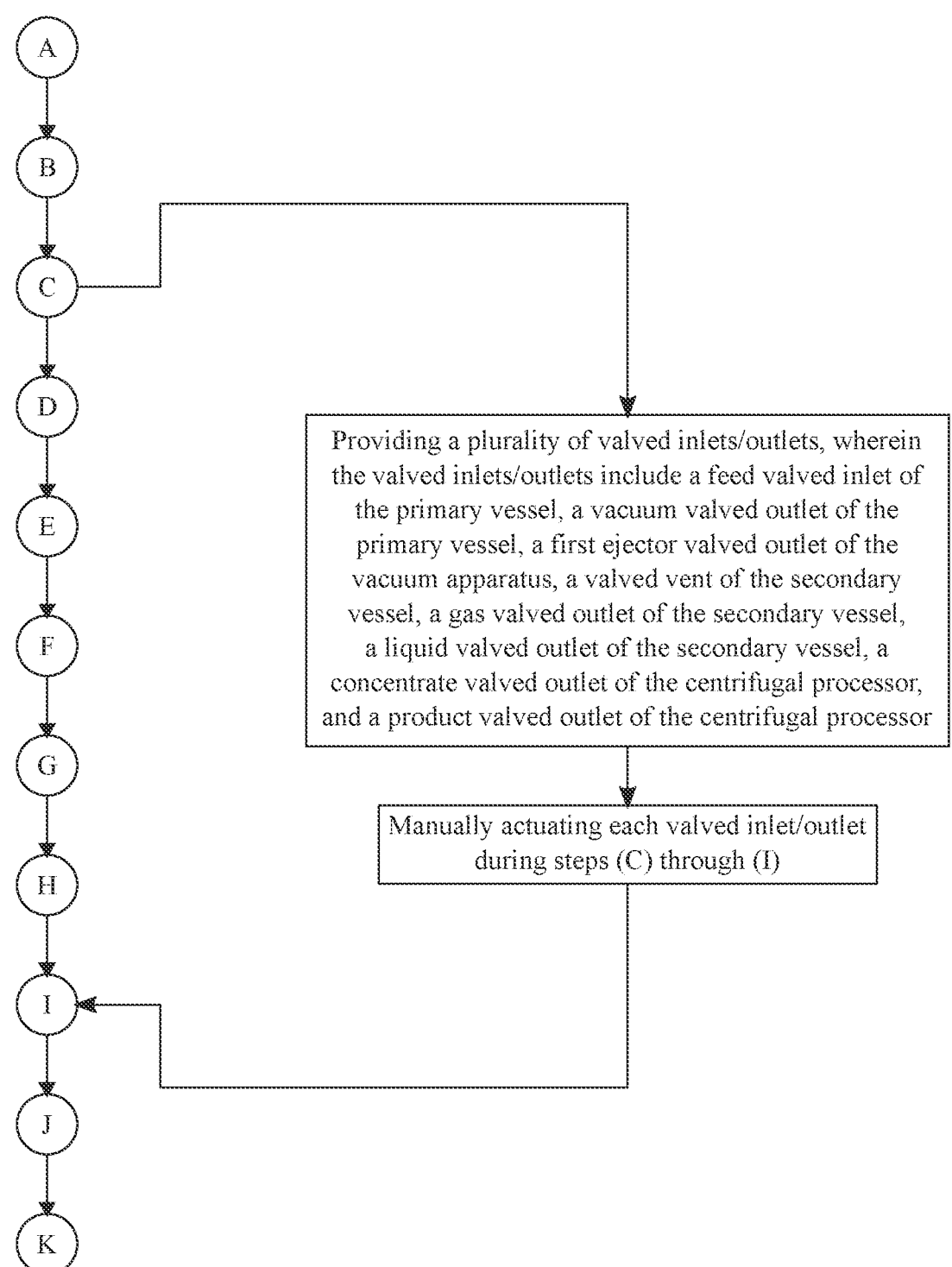
FIG. 19 is a flowchart illustrating a subprocess for manually actuating the valved inputs/outputs for the system of the present invention.

The system of the present invention may also use a plurality of valved inlets/outlets to control fluid-flow amongst the primary vessel 1, the vacuum apparatus 2, the secondary vessel 3, and any other functional component for the system of the present invention. The valved inlets/outlets include, but are not limited to, a feed valved inlet 13 of the primary vessel 1, a vacuum valved outlet 14 of the primary vessel 1, a first ejector valved outlet 23 of the vacuum apparatus 2, a valved vent 32 of the secondary vessel 3, a gas valved outlet 33 of the secondary vessel 3, a liquid valved outlet 34 of the secondary vessel 3, a concentrate valved outlet 71 of the centrifugal processor 7, and a product valved outlet 72 of the centrifugal processor 7. Moreover, as can be seen in FIGS. 1 and 18, if each valved inlet/outlet is electronically connected to a controller 6, then the controller 6 would automatically actuate each valved inlet/outlet at the necessary time during Steps C through I, which would provide a precise and accurate way of controlling the fluid-flow through the system of the present invention. Alternatively, as can be seen in FIGS. 1 and 19, each valved inlet/outlet could be manually actuated by a user at the necessary time during Steps C through I, which would allow the user to conscientiously and carefully control the fluid-flow through the system of the present invention.

Although the invention has been explained in relation to its preferred embodiment, it is to be understood that many other possible modifications and variations can be made without departing from the spirit and scope of the invention as hereinafter claimed.

What is claimed is:

1. A method of distilling/desalinating water in a vacuum-applied multi-phase centrifugal manner, the method comprising the steps of:

(A) providing at least one primary vessel, at least one vacuum apparatus, at least one secondary vessel, and at least one centrifugal processor, wherein the primary vessel and the secondary vessel are in fluid communication through the vacuum apparatus, and wherein the primary vessel and the secondary vessel are in fluid communication with the centrifugal processor;

(B) providing a quantity of source water retained by the primary vessel;

(C) evaporating a first water portion off the quantity of source water and transferring the first water portion from the primary vessel, through the vacuum apparatus, and into the secondary vessel by generating a vacuum pressure inside the primary vessel with the vacuum apparatus;

(D) condensing and retaining the first water portion inside the secondary vessel as an ambient pressure is maintained inside the secondary vessel;

(E) freezing a second water portion from the quantity of source water within the primary vessel by generating the vacuum pressure inside the primary vessel with the vacuum apparatus;

(F) draining a liquid remaining portion of the quantity of source water out of the primary vessel, wherein the liquid remaining portion is located underneath the second water portion;

(G) transferring the second water portion from the primary vessel into the centrifugal processor;

(H) spinning and aerating salinated water portions out of the second water portion with the centrifugal processor;

(I) transferring the first water portion from the secondary vessel into the centrifugal processor;

(J) spinning and melting the second water portion with the first water portion inside the centrifugal processor in order to form a quantity of purified water; and (K) draining the quantity of purified water out of the centrifugal processor.

2. The method as claimed in claim 1, wherein the primary vessel and the secondary vessel are thermally-insulated vessels.

3. The method as claimed in claim 2, wherein the thermally-insulated vessels are double-walled vessels, and wherein a vacuum is retained within the double-walled vessels.

4. The method as claimed in claim 1 comprising the steps of:

providing the primary vessel with a gravitationally-higher side and a gravitationally-lower side, wherein the gravitationally-higher side and the gravitationally-lower side are positioned opposite to each other about the primary vessel, and wherein a feed valved inlet of the primary vessel is positioned proximal to the gravitationally-higher side and is positioned distal to the gravitationally-lower side; and receiving the quantity of source water through the feed valved inlet and into the primary vessel before step (B).

5. The method as claimed in claim 1 comprising the steps of:

providing the primary vessel with a gravitationally-higher side and a gravitationally-lower side, wherein the gravitationally-higher side and the gravitationally-lower side are positioned opposite to each other about the primary vessel, and wherein a vacuum valved outlet of the primary vessel is in fluid communication with a vacuum inlet of the secondary vessel through the vacuum apparatus, and wherein the vacuum valved outlet is positioned proximal to the gravitationally-higher side and is positioned distal to the gravitationally-lower side; and transferring the first water portion from the primary vessel, through the vacuum valved outlet, through the vacuum apparatus, through the vacuum inlet, and into the secondary vessel during step (C).

6. The method as claimed in claim 1 comprising the steps of:

providing the vacuum apparatus as a gas ejector, wherein the primary vessel is in fluid communication with a first ejector inlet of the gas ejector, and wherein a motive steam is fed into a second ejector inlet of the gas ejector, and wherein a first ejector valved outlet of the gas ejector is selectively opened to the atmosphere, and wherein a second ejector outlet of the gas ejector is in fluid communication with the secondary vessel; and driving the motive steam through the gas ejector in order to generate the vacuum pressure inside the primary vessel during steps (C) and (E).

7. The method as claimed in claim 1 comprising the steps of:

providing the secondary vessel with a valved vent; and maintaining the ambient pressure inside the secondary vessel by selectively opening the valved vent to the atmosphere during step (D).

8. The method as claimed in claim 1 comprising the steps of:

providing the primary vessel with a gravitationally-higher side and a gravitationally-lower side, wherein the gravitationally-higher side and the gravitationally-lower side are positioned opposite to each other about the primary vessel, and wherein a processor valved outlet of the primary vessel is in fluid communication with the centrifugal processor, and wherein the processor valved outlet is positioned proximal to the gravitationally-lower side and is positioned distal to the gravitationally-higher side;

providing the centrifugal processor with a concentrate valved outlet; and draining the liquid remaining portion out of the primary vessel, through the processor valved outlet, through the centrifugal processor, and out of the concentrate valved outlet during step (F).

9. The method as claimed in claim 1 comprising the steps of:

providing the primary vessel with a gravitationally-higher side and a gravitationally-lower side, wherein the gravitationally-higher side and the gravitationally-lower side are positioned opposite to each other about the primary vessel, and wherein a processor valved outlet of the primary vessel is in fluid communication with the centrifugal processor, and wherein the processor valved outlet is positioned proximal to the gravitationally-lower side and is positioned distal to the gravitationally-higher side, and wherein a wire screen is mounted within the primary vessel, and wherein the wire screen is positioned proximal to the gravitationally-higher side and is positioned distal to the gravitationally-lower side;

freezing the second water portion amongst the wire screen during step (E);

dislodging the second water portion as a plurality of ice particles off of the wire screen during step (G); and transferring the ice particles from the primary vessel, through the processor valved outlet, and into the centrifugal processor.

10. The method as claimed in claim 1 comprising the steps of:

providing the centrifugal processor with a processor housing, a mesh receptacle, and a concentrate valved outlet, wherein the mesh receptacle is rotatably mounted within the processor housing about a shared central axis;

receiving the second water portion as a plurality of ice particles with the mesh receptacle during step (G);

rotating the mesh receptacle within the processor housing and simultaneously aerating a hot motive gas through the processor housing in order to melt the salinated water portions off of the ice particles during step (H); and draining the salinated water portions out of the centrifugal processor and through the concentrate valved outlet.

11. The method as claimed in claim 10 comprising the steps of:

providing the secondary vessel with a gas valved outlet, wherein the gas valved outlet is in fluid communication with the centrifugal processor; and feeding a motive steam as the hot motive gas from the secondary vessel, through the gas valved outlet, and into the centrifugal processor.

12. The method as claimed in claim 10 comprising the steps of:

further providing the centrifugal processor with a network of perforated piping, wherein the network of perforated piping is distributed throughout and mounted within the mesh receptacle; and dispensing the hot motive gas throughout the mesh receptacle with the network of perforated piping.

13. The method as claimed in claim 10, wherein the mesh receptacle is a cylindrical shape with an open end and a closed end, and wherein the open end is positioned proximal to the primary vessel, and wherein the closed end is positioned distal to the primary vessel.

14. The method as claimed in claim 1 comprising the steps of:

providing the secondary vessel with a liquid valved outlet, wherein the liquid valved outlet is in fluid communication with the centrifugal processor; and transferring the first water portion from the secondary vessel, through the liquid valved outlet, and into the centrifugal processor during step (I).

15. The method as claimed in claim 1 comprising the steps of:

providing the centrifugal processor with a processor housing and a mesh receptacle, wherein the mesh receptacle is rotatably mounted within the processor housing about a shared central axis; and rotating the mesh receptacle within the processor housing and simultaneously retaining the first water portion within the processor housing, until the second water portion as a plurality of ice particles held within the mesh receptacle melts into the first water portion during step (J).

16. The method as claimed in claim 1 comprising the steps of:

providing the centrifugal processor with a processor housing, a mesh receptacle, and a product valved outlet, wherein the mesh receptacle is rotatably mounted within the processor housing about a shared central axis; and draining the quantity of purified water out of the mesh receptacle and the processor housing and through the product valved outlet during step (K).

17. The method as claimed in claim 1, wherein at least one internal modification to the primary vessel is configured to promote ice-crystal growth at specific nucleation sites during step (E).

18. The method as claimed in claim 1 comprising the steps of:

providing at least one diagnostic sensor and a controller, wherein the diagnostic sensor is operatively integrated into the primary vessel, the secondary vessel, the vacuum apparatus, the centrifugal processor, or a combination thereof, and wherein the diagnostic sensor is electronically connected to the controller;

capturing at least one measurement reading with the diagnostic sensor during steps (C) through (K); and executing at least one data-processing task based on the measurement reading with the controller.

19. The method as claimed in claim 1 comprising the steps of:

providing a plurality of valved inlets/outlets and a controller, wherein the valved inlets/outlets include a feed valved inlet of the primary vessel, a vacuum valved outlet of the primary vessel, a first ejector valved outlet of the vacuum apparatus, a valved vent of the secondary vessel, a gas valved outlet of the secondary vessel, a liquid valved outlet of the secondary vessel, a concentrate valved outlet of the centrifugal processor, and a product valved outlet of the centrifugal processor, and wherein the valved inlets/outlets are electronically connected to the controller; and automatically actuating each valved inlet/outlet with the controller during steps (C) through (K).

20. The method as claimed in claim 1 comprising the steps of:

providing a plurality of valved inlets/outlets, wherein the valved inlets/outlets include a feed valved inlet of the primary vessel, a vacuum valved outlet of the primary vessel, a first ejector valved outlet of the vacuum apparatus, a valved vent of the secondary vessel, a gas valved outlet of the secondary vessel, a liquid valved outlet of the secondary vessel, a concentrate valved outlet of the centrifugal processor, and a product valved outlet of the centrifugal processor; and manually actuating each valved inlet/outlet during steps (C) through (K).

* * * * *